(12) United States Patent
Shiu

(10) Patent No.: US 7,001,223 B1
(45) Date of Patent: Feb. 21, 2006

(54) WIRE ORDERING DEVICE FOR COMPUTER OR COMMUNICATION DEVICE

(75) Inventor: Shih Yuan Shiu, Tau-Yung Hsien (TW)

(73) Assignee: Te-Yi-Jan Technology Co., LTD, Tau-Yuan Hsien (TW)

( * ) Notice: Subject to any disclaimer, the term of this patent is extended or adjusted under 35 U.S.C. 154(b) by 0 days.

(21) Appl. No.: 11/129,632

(22) Filed: May 16, 2005

(51) Int. Cl.
    *H01R 9/22* (2006.01)
(52) U.S. Cl. ................................... 439/719
(58) Field of Classification Search ........... 439/719, 439/450
    See application file for complete search history.

(56) References Cited

U.S. PATENT DOCUMENTS 4,095,430 A * 6/1978 Hannan ............... 405/302.1
4,808,116 A * 2/1989 Unger et al. ............. 439/719
4,929,198 A * 5/1990 Strate et al. ............. 439/811
5,947,765 A * 9/1999 Carlson et al. .......... 439/719

* cited by examiner

*Primary Examiner*—Briggitte R. Hammond

(57) ABSTRACT

A wire ordering device for a computer or a communication device is disclosed. A protrusion is located at a top and is formed with a penetrating hole. Each of two shoulders of the protrusion has a respective embedding groove. The press has a through hole corresponding to the penetrating hole of the seat and has tenons at a bottom side thereof corresponding to the embedding grooves. Several claws extend from the press. The tenons are insertable into the embedding grooves. Thus, the claws press a periphery of the seat so that the press is positioned upon the seat. A screw unit has a screw rod which passes through the through hole of the press and the penetrating hole of the seat and then is locked to screw hole of a casing of a computer or a communication device and connect with wires of a computer or communication device.

6 Claims, 7 Drawing Sheets

WIRE ORDERING DEVICE FOR COMPUTER OR COMMUNICATION DEVICE

FIELD OF THE INVENTION

The present invention relates to wire ordering devices, and in particular to a wire ordering device used in a computer or a communication device which can be connected with various kinds of wires. The wire ordering device can be fixed to a computer or a communication device so as to arrange wires orderly and effectively.

BACKGROUND OF THE INVENTION

Due to technology improvement and fast development of Internet media technology, various digital computer related products are continuously researched and developed. These products not only provide many services conveniently, but also are useful devices for transmitting knowledge and information more quickly. However, all computers or communication devices must be connected with wires for receiving power. Furthermore, for the signal circuits and peripherals, such as external data stored medium, mice, keyboards, printers, multi-media devices, screens, amplifiers, microphones, communication devices, data links, digital cameras or an internet circuits and external signal circuits to manage electric appliances, a light or a security service devices, all those computer-center products should be connected with a wire for receiving power. Thus, power wires and signal circuits of a computer or a communication device usually are complicated, messy and disordered. Not only the user cannot manage those power wires and signal circuits orderly, but also a computer manager easy confuses by those complicated wires, in particular, when wires are needed to be maintained or replaced.

The various objects and advantages of the present invention will be more readily understood from the following detailed description when read in conjunction with the appended drawing.

SUMMARY OF THE INVENTION

The primary objective of the present invention is to provide a wire ordering device of a computer or a communication device. The wire ordering device comprises a seat and a press, by use of a screw unit to screw the wire ordering device into a casing of a computer or a communication device. A wire can pass through a wire passing hole between a press and claws as well as seat, and then is pressed in a fixed position so as to order wires regularly and effectively. In addition, the wire ordering device can guide a circuit of another electric equipment to connect with the computer or communication device so as to manage wires orderly and effectively. The wire ordering device can not only improve quality of the environment, but also can provide a convenience for a user and a computer maintainer.

The secondary object of prevent invention is to provide a wire ordering device of a computer or communication device, wherein the press and the seat is correspondent to be embedded in each other. By use of a screwed unit to screw the wire ordering device into a screwed hole of a computer or a communication device, the assembly of the wire ordering device is completed by the given screwed hole and the wire ordering device. Furthermore, the wire ordering device is fixed firmly to the casing of the computer or communication device. Thus, the wire ordering device is not only small size and easy to assemble, but also can be installed with any casing of a computer or a communication device for a preferable assembly time and space so as to attain the goal of user convenience.

The third object of prevent invention is to provide a wire ordering device of a computer or communication device, wherein the wire ordering device has the advantages of simple composition, easy manufacture and low manufacture cost. In addition, the wire ordering device can be screwed into a screwed hole of a casing of a computer or communication device properly. In operation, at least one wire ordering device can be installed in at least one screwed hole of a casing of a computer or communication device and fixed firmly so as to offer several advantages of a preferable wire direction, convenient classification and easy use.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
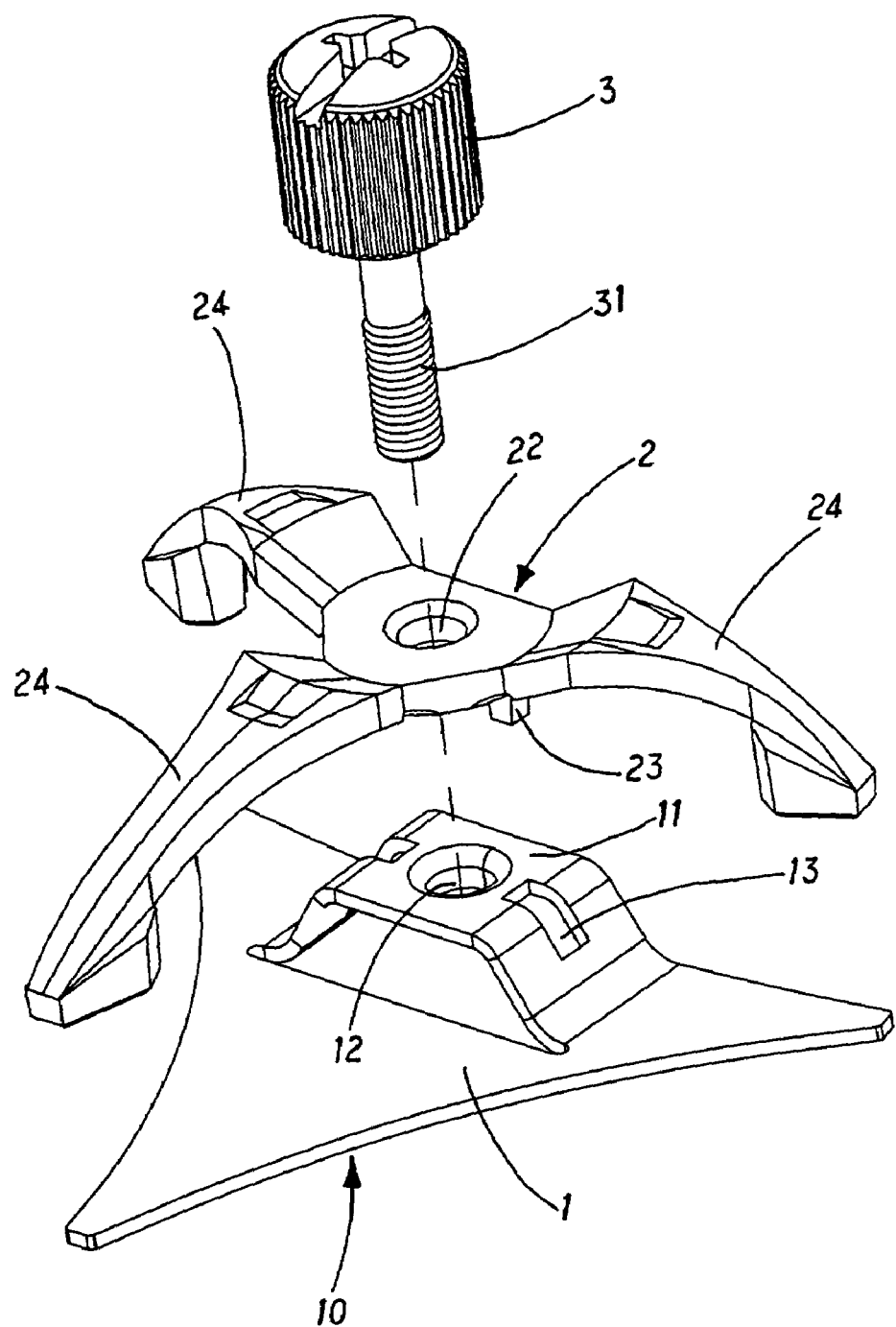
FIG. 1 is an exploded perspective view of the wire ordering device of the present invention.
Figure 2:
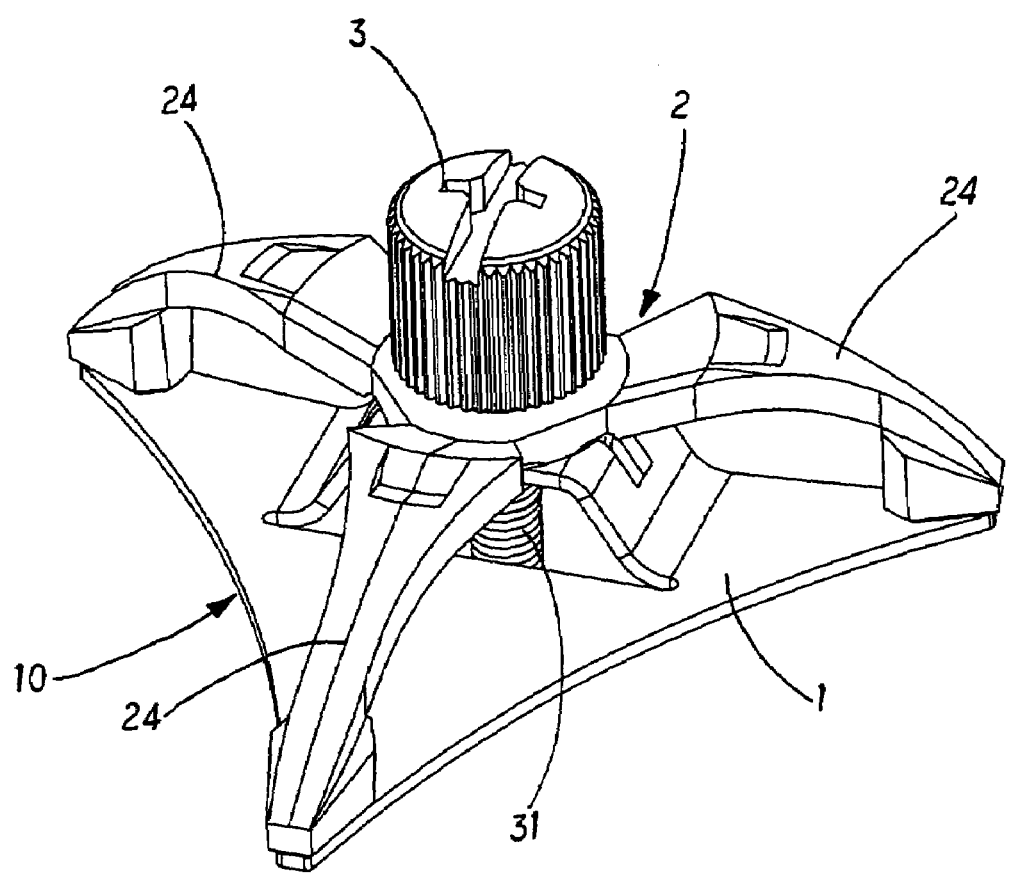
FIG. 2 is an assembled perspective view of the wire ordering device of the present invention.
Figure 3:
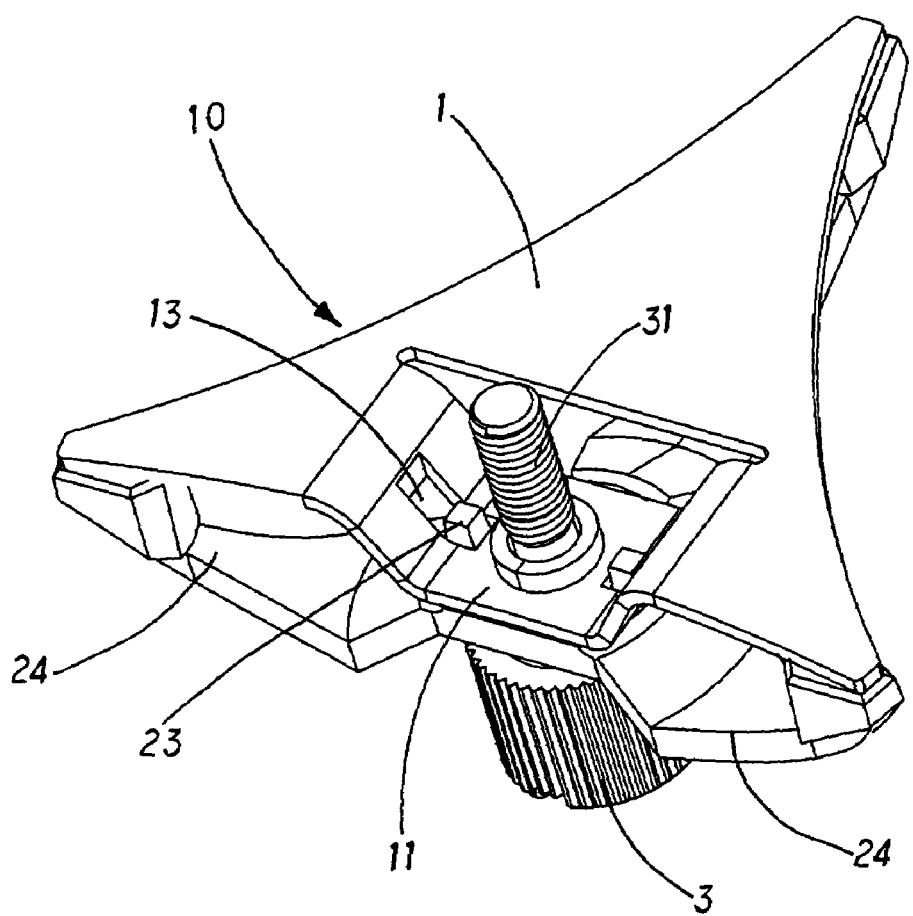
FIG. 3 is an assembled elevational view of the wire ordering device of the present invention.
Figure 4:
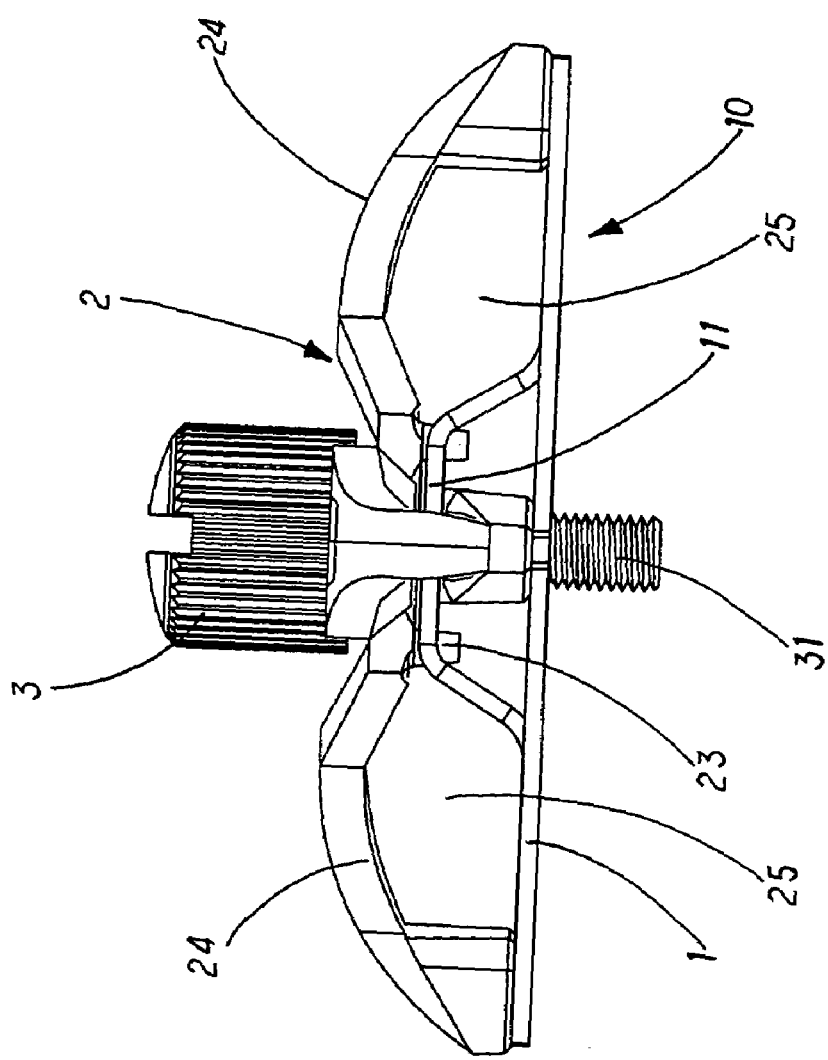
FIG. 4 is an assembled front view of the wire ordering device of the present invention.
Figure 5:
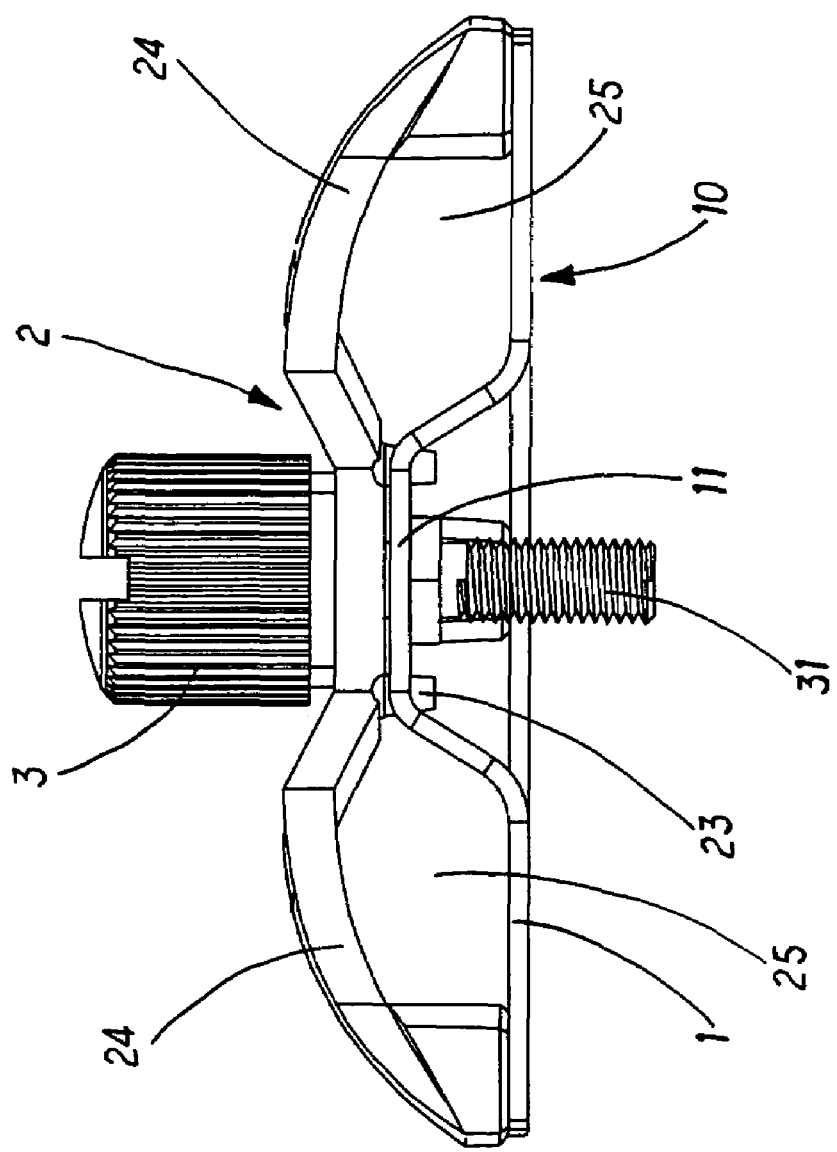
FIG. 5 is an assembled backside view of the wire ordering device of the present invention.
Figure 6:
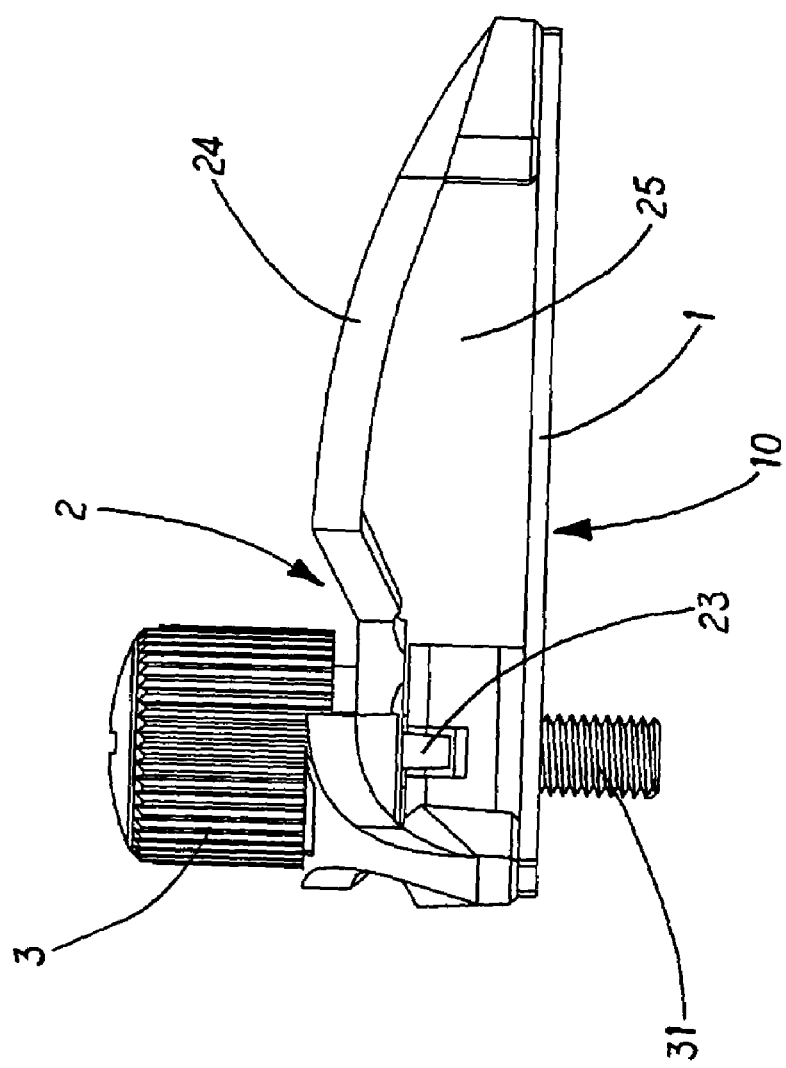
FIG. 6 is a lateral-perspective view of the wire ordering device of the present invention.
Figure 7:
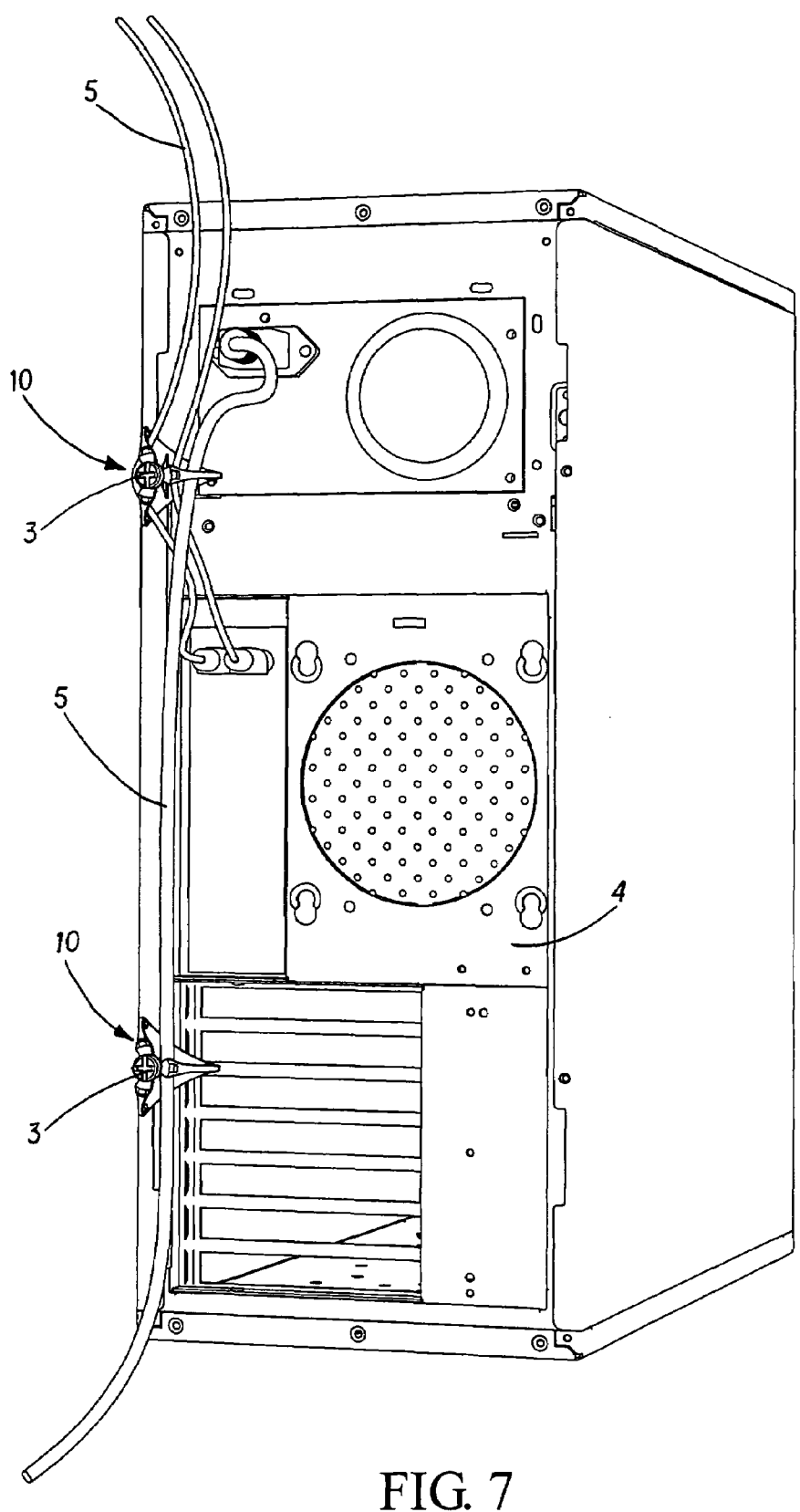
FIG. 7 is an assembled view in operation of wire ordering device of the present invention.

With referring to FIGS. 1 to 3, a wire ordering device for a computer or a communication device. The wire ordering device has the following elements. A seat 1 is a plate body having an approximately triangular shape. A protrusion 11 is located at a top of the seat 1 near one edge of the seat 1 and is formed with a penetrating hole 12. Each of two shoulders of the protrusion 11 has a respective embedding groove 13. A press 2 is preferably made of plastics. The press 2 has a through hole 22 corresponding to the penetrating hole 12 of the seat 1 and has tenons 23 at a bottom side thereof corresponding to the embedding grooves 13. Three claws 24 extends from the press 2. The tenons 23 at the bottom of the press 2 are insertable into the embedding grooves 13 of the protrusion 11, as illustrated in FIGS. 4 and 5. Thus, the claws 24 press a periphery of the seat 1 so that the press 2 is positioned upon the seat 1. A screw unit 3 has a screw rod 31 which passes through the through hole 22 of the press 2 and the penetrating hole 12 of the seat 1 and then is locked to screw hole (not shown) of a casing 4 of a computer or a communication device, as illustrated in FIG. 7. The bottom of the screw unit 3 presses the press 2 and the seat 1 so that they are tightly engaged. Between the bottom of each claw 24 and the seat 1 is formed with a wire passing hole 25 for passing through a wire (referring to FIGS. 5 and 6).

By above-mentioned elements, the wire ordering device 10 can be fixed firmly to a casing 4 of a computer or communication device (referring to FIG. 7). A wire 5 can pass through a wire passing hole 25 between the press 2 and the claws 24 as well as seat 1, and then is pressed in a fixed position so as to order wire 5 regularly and effectively. In addition, the wire ordering device can guide a circuit of another electric equipment to connect with the computer or communication device. Furthermore, the wire ordering device of the present invention is not only small size, but also can be fixed firmly and screwed into a screwed hole of the casing 4 of a computer or communication device. Thus, in operation, at least one wire ordering device can be installed in at least one screwed hole of the casing 4 of a computer or communication device and fixed firmly so as to offer several advantages of a preferable wire direction, classification and easy use.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claim is:

1. A wire ordering device for a computer or a communication device comprising:

a seat being a plate body;

a protrusion located at a top of the seat and near one edge of the seat;

the protrusion being formed with a penetrating hole;

a press having a through hole at a position corresponding to the penetrating hole of the seat;

a plurality of claws extending from the press; the claws pressing a periphery of the seat so that the press is positioned upon the seat; the claws being engaged into the protrusion; and a screw unit having a screw rod which passes through the through hole of the press and the penetrating hole of the seat and then is locked to screw hole of a casing of a computer or a communication device; the bottom of the screw unit pressing the press and the seat so that they are tightly engaged; between the bottom of each claw and the seat being formed with a wire passing hole for passing through a wire.

2. The wire ordering device for a computer or a communication device as claimed in claim 1, wherein each of two shoulders of the protrusion has a respective embedding groove; the press has a through hole corresponding to the penetrating hole of the seat and has tenons at a bottom side thereof corresponding to the embedding grooves; the tenons at the bottom of the press are insertable into the embedding grooves of the protrusion.

3. The wire ordering device for a computer or a communication device as claimed in claim 1, wherein a press is preferably made of plastics.

4. The wire ordering device for a computer or a communication device as claimed in claim 1, wherein the seat has an approximately triangular shape; the protrusion has the penetrating hole; the press has the through hole corresponding to the penetrating hole of the seat; the press has three claws extended from the lateral sides thereof.

5. The wire ordering device for a computer or a communication device as claimed in claim 4, wherein each of two shoulders of the protrusion has a respective embedding groove; the press has a through hole corresponding to the penetrating hole of the seat and has tenons at a bottom side thereof corresponding to the embedding grooves; the tenons at the bottom of the press are insertable into the embedding grooves of the protrusion.

6. The wire ordering device for a computer or a communication device as claimed in claim 4, wherein a press is preferably made of plastics.

* * * * *